United States Patent [19]

Morita et al.

[11] Patent Number: 5,323,487
[45] Date of Patent: Jun. 21, 1994

[54] PRINTER

[75] Inventors: Tetsuya Morita; Toshihide Fukumoto, both of Kawasaki, Japan

[73] Assignee: Canon Kabushiki Kaisha, Tokyo, Japan

[21] Appl. No.: 82,157

[22] Filed: Jun. 28, 1993

Related U.S. Application Data

[63] Continuation of Ser. No. 692,644, Apr. 29, 1991, abandoned.

[30] Foreign Application Priority Data

May 2, 1990 [JP] Japan ................................ 2-116457
Jun. 21, 1990 [JP] Japan ................................ 2-161390

[51] Int. Cl.⁵ ............................................. G06F 15/00
[52] U.S. Cl. ................................... 395/115; 395/109
[58] Field of Search ................ 395/101, 109, 115; 346/154, 157; 355/326 R, 327, 328; 358/500, 517, 518, 537

[56] References Cited

U.S. PATENT DOCUMENTS 4,857,955 8/1989 Crandall ............................ 395/109
5,020,004 5/1991 Igarashi ............................ 395/109

FOREIGN PATENT DOCUMENTS 63-288562 11/1988 Japan .

OTHER PUBLICATIONS

IBM Systems Journal, DeBry et al., "Architectures of Advanced Function Printing", vol. 27, No. 2, pp. 234-245, 1988.

Primary Examiner—Arthur G. Evans
Attorney, Agent, or Firm—Fitzpatrick, Cella, Harper & Scinto

[57] ABSTRACT

The present invention relates to a printer which can print in at least two print colors and is especially capable of outputting a desired print color. The printer comprises a printing unit having plural developing colors, and a printer control unit which outputs image data, which has been input from host equipment and developed in a bit map memory, into the printing unit. The printer control unit has plural color modulation data, and selects one of these color modulation data for color modulation of the bit map data.

10 Claims, 10 Drawing Sheets

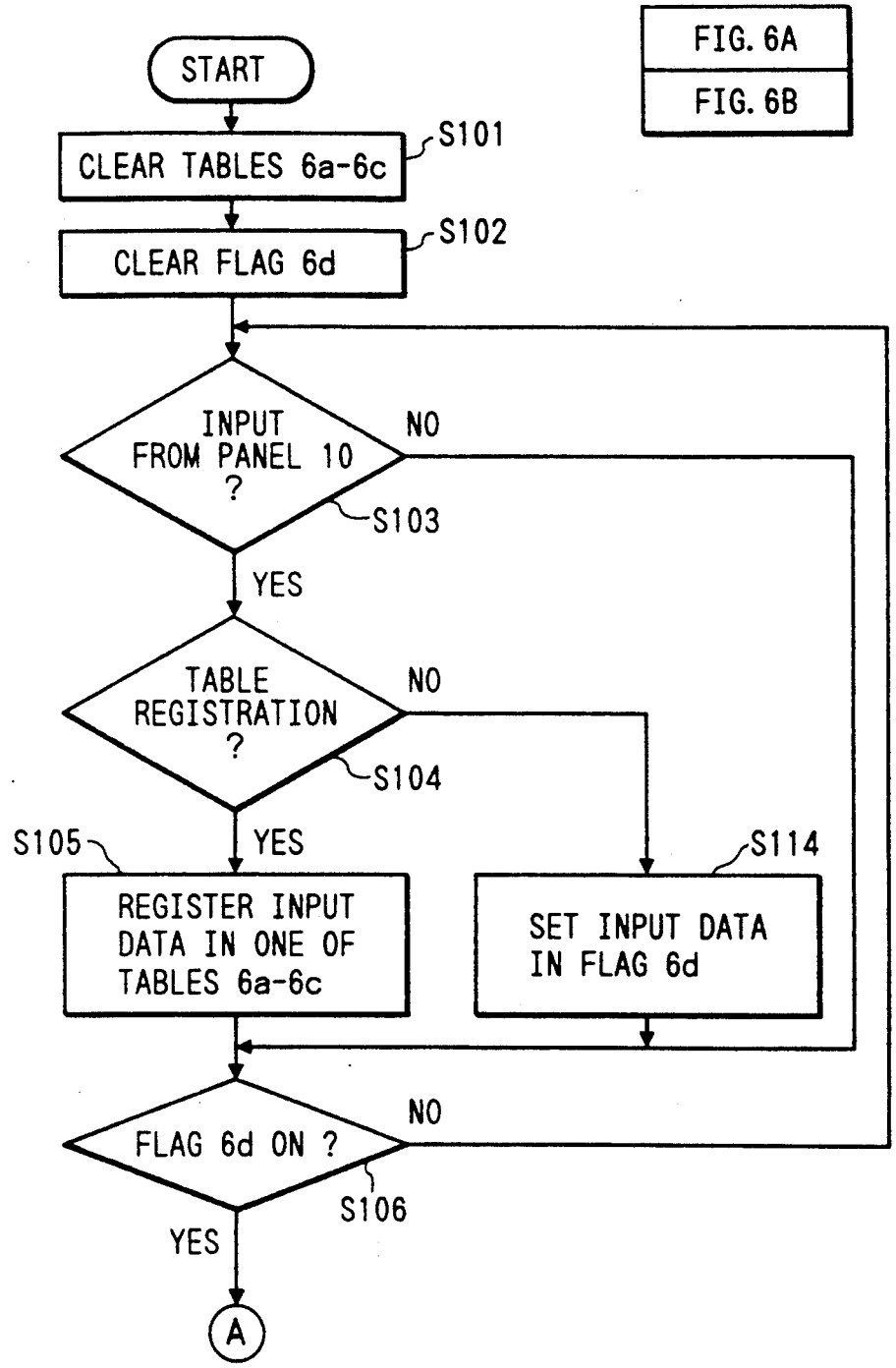

FIG. 8A

FONT | NAME | COLOR | FONT DATA | FONT PATTERN |

FIG. 8B

FORM | NAME | COLOR | FORM DATA |

FIG. 8C

IMAGE | NAME | COLOR | IMAGE DATA |

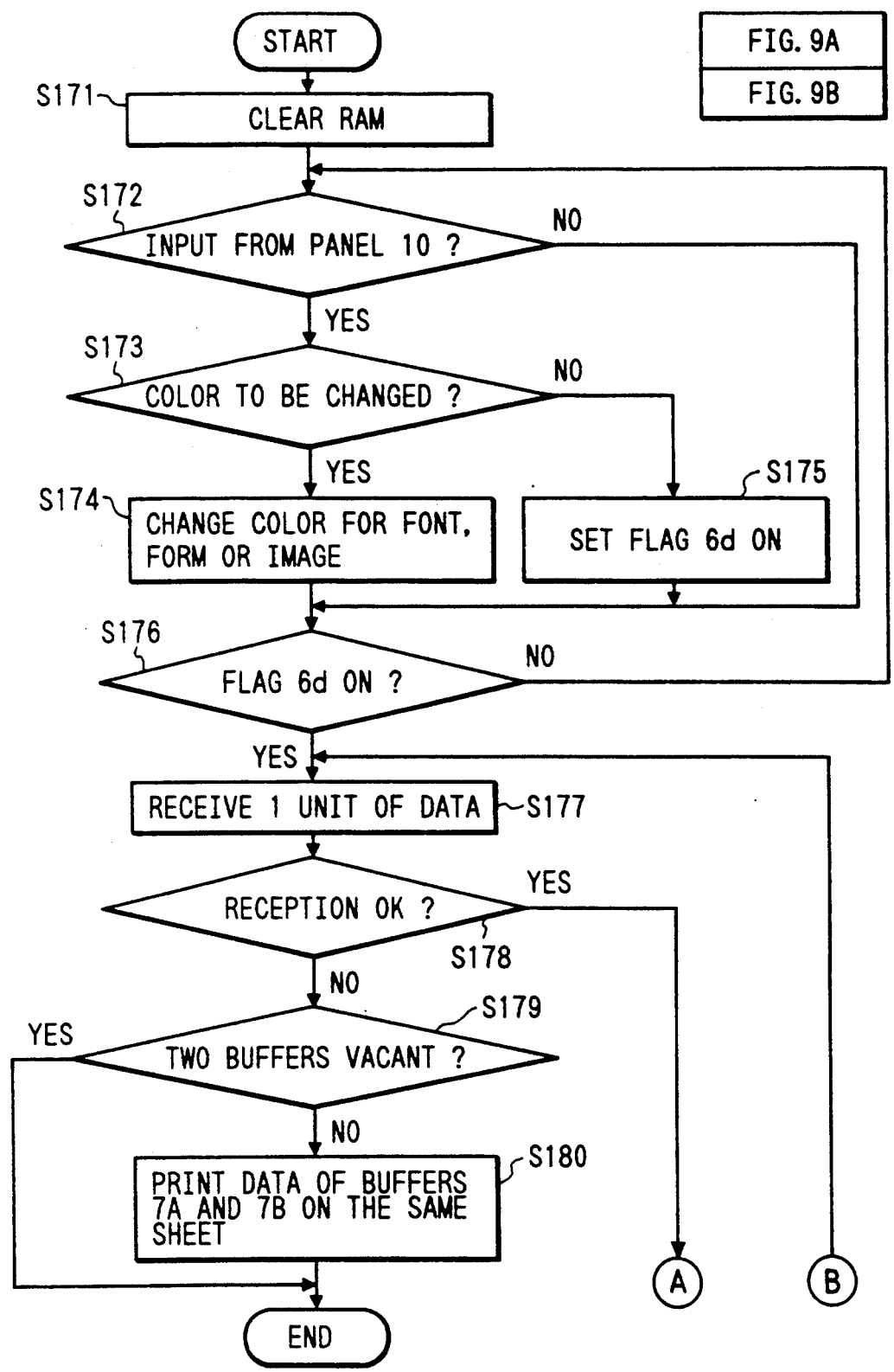

PRINTER

This application is a continuation of application Ser. No. 07/692,644 filed Apr. 29, 1991, now abandoned.

BACKGROUND OF THE INVENTION

Field of the Invention

The present invention relates to a printer which has at least two print colors and is especially capable of outputting in a desired print color.

Related Background Art

A conventional multicolor printer has a plurality of bit map memories corresponding to develop colors, and is so constructed that each color of image data to be input from the host equipment is developed into the respective bit map memories.

The above conventional technique, however, has a defect in which the color output function of the printer cannot be fully utilized because when the input data is such a single color data as a list for control information, it forcibly outputs only in black or operates to output using one basic color in the command, etc. since color designation is completely entrusted to the host equipment side.

When printing in multicolor in the conventional multicolor printer, a sender of printing data, that is, a host computer, etc. included a control code, etc. for designating a color out of print colors available for the printer in a data for character code, image, etc. to be output for transmitting.

Since, however, the control code for color designation should be always included in the input data to change the print color, the above conventional device had the following defects:

① When a different color is used for the print color for the font, form and image, the entire amount of input data will considerably increase because the control code for color designation is required each time.

② When only the print color should be changed in data, which has been output once, the control code for color designation for a pertinent portion should be found and changed, and therefore it takes a lot of time and labor.

③ When single color data is changed into multicolor data (same as ②), it takes a lot of time and labor.

SUMMARY OF THE INVENTION

It is an object of the present invention to provide a multicolor printer which, even if the input data is single color data, is capable of fully exhibiting the function of the multicolor printer by converting the single color data into desired intermediate color data.

To attain the above-mentioned object, the present invention provides a printer comprising a printing unit having a plurality of developing colors, and a printer control unit which outputs image data, which has been input from host equipment and developed in a bit map memory, into the printing unit, wherein the printer control unit has a plurality of color modulation data, and selects out of these color modulation data to color modulate the bit map data.

According to the present invention, it is possible to convert input single color data into multicolor data in order to print the color image by selecting color modulation data and color modulating the bit map data.

The above color modulation data is color pattern data to dither modulate each color element, for example. By executing a logic operation between each item of color pattern data and a single color data, it is possible to convert into a color image based on a combination of each modulation data for printing.

It is also an object of the present invention to improve such conventional technique and to provide a printer capable of printing a multicolor image which an operator intended while receiving the single color print information.

To attain the above object, the present invention provides a printer for recording a synthetic image in at least two colors on a recording medium in accordance with a print data, which has been input from outside, having: input means for inputting print information from outside; designating means for designating a desired image and a print color for the image; discriminating means for discriminating whether or not an image designated by the designating means exists in the print information, which has been input from the input means; and when it has been discriminated by the discriminating means that the image designated by the designating means exists in the print information, which has been input by the input means, recording means for recording the image in a color designated by the designating means.

In such a configuration according to the present invention, the operator designates an image which he intended, and a print color for its image using setting means. When the designated image exists in the print information which has been input by the input means, the image is recorded in the designated color.

BRIEF DESCRIPTION OF THE DRAWINGS

FIGS. 6, 6A and 6B is a flow chart showing an operation of a CPU in the first embodiment.

FIGS. 8A, 8B and 8C show examples of data format for registration area.

FIGS. 9, 9A and 9B is a flow chart showing an operation of a CPU in the second embodiment.

DESCRIPTION OF THE PREFERRED EMBODIMENTS

Figure 1:
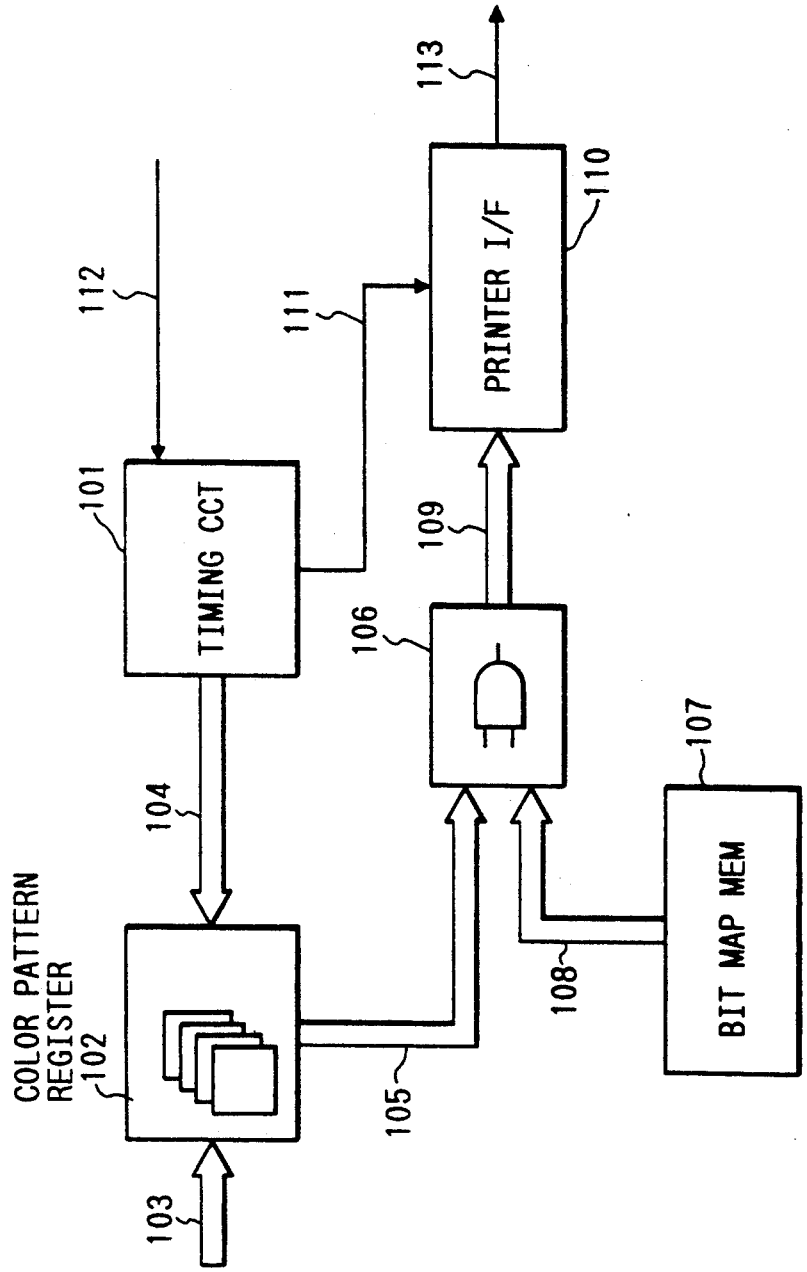
FIG. 1 is a block diagram showing a configuration of a printer to output by converting input single color data into multicolor data.

FIG. 1 is a block diagram showing a configuration of a printer to output by converting input single color data into multicolor data.

In FIG. 1, a timing circuit 101 interfaces with a printing unit (not shown) to control a series of operations of this printer.

A color pattern register 102 stores color pattern data, on the basis of which dither modulation is performed. In the embodiment of the present invention, dither pattern data for four colors: yellow (Y), magenta (M), cyan (C) and black (K) are used for dither modulation. Accordingly, the color pattern register 102 has data blocks for four colors: Y, M, C and K, and each block has a structure of 16 bit×16 bit, for example.

The above color pattern data for each color have been prepared in a plurality of types, and stored in a ROM (not shown). These data are selected in accordance with the operator's instruction, and are written in the register 102 through a bus 103. The register 102 outputs in order these pattern data for each color thus developed into a bus 105 in accordance with a control signal 104 from the timing circuit 101.

An arithmetic circuit 106 is an AND circuit, in which an AND operation of an image data, which is input from the bit map memory 107 through a bus 108, with the color pattern data is performed. The arithmetic circuit 106 outputs an image data modulated by the color pattern data to a printer interface unit 110 through a bus 109.

A signal 111 is a synchronizing signal to the printer interface unit 110, a signal 112 is a synchronizing signal from the printing unit, and a signal 113 is an image data signal to the printing unit.

The operation in the above configuration will be described.

Figure 2:
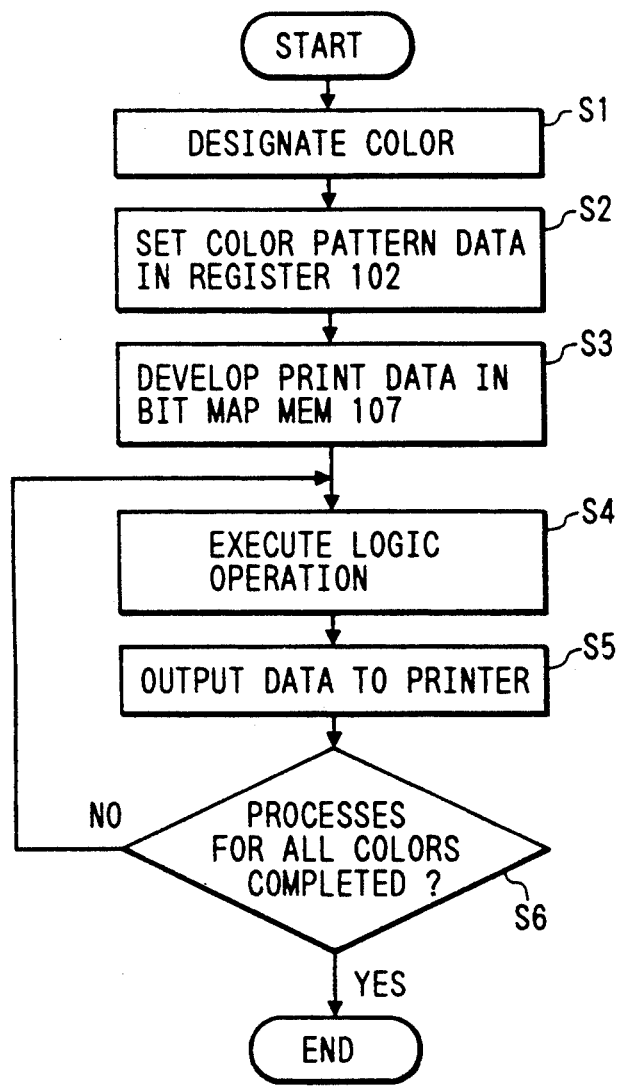
FIG. 2 is a flow chart showing an operation in the configuration in FIG. 1.

FIG. 2 is a flow chart showing the operation in the embodiment according to the present invention.

The operator first designates color using a command, etc. for data without color designated (S1). To perform this operation, a number is set, for example, corresponding to each color beforehand, and a key board (not shown) is used to input this number together with the command for color designation.

When the color has been designated in this way, a color pattern data corresponding to the color designated from the ROM is called, and the color pattern data is set to the register 102 through the bus 103 (S2).

Thereafter, single color data to be printed is input from the host equipment, and is developed in the bit map memory 107 (S3). Since the input data is a single color, a sheet of the bit map memory 107 is used.

This data is transmitted to the arithmetic circuit 106 in accordance with the control of the timing circuit 101. In this arithmetic circuit 106, an AND operation of the data is executed with a corresponding single color pattern data of the color pattern data 102 (S4) to output to the printing unit through the interface unit 110 (S5).

For these four pattern data, the operations of S4 and S5 are repeated to complete converting the single color data into multi-color data (S6).

Thereafter, the printing unit prints in the same manner as an ordinary multicolor data.

In the above embodiment, 16 bit×16 bit has been used for the color pattern, but the present invention is not limited to this example.

Also for color elements, four colors: Y, M, C and K have been used, but the present invention is not limited to this example either.

The first embodiment, in which a desired color is set to an input single color data as the output data, will be described.

Figure 3:
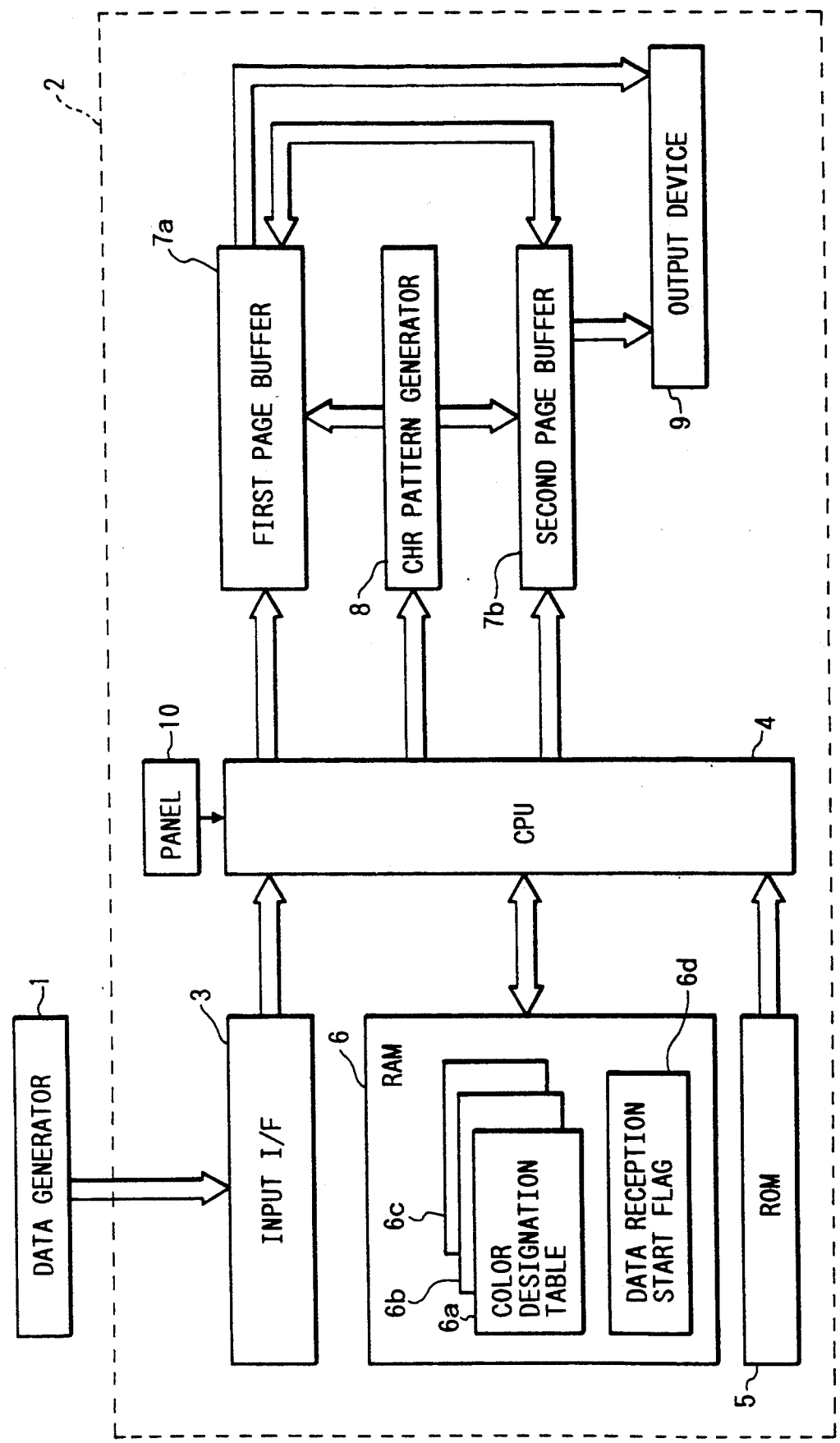
FIG. 3 is a block diagram showing a configuration of the first embodiment to set a desired color in input single color data as the output data.

FIG. 3 is a block diagram showing a printer according to the embodiment of the present invention. In the embodiment, a two-color (red and black) printer is taken as an example for description.

In FIG. 3, a data generator 1 consisting of a host computer, for example, outputs a print information (multicolor document image data). A printer 2 of the embodiment prints in multicolor on the basis of a print information which has been input from the data generator 1, and is equipped with the following components:

An input interface unit 3 receives print information from the data generator 1, and a CPU 4 collectively controls the entire printer. A ROM 5 stores an operation procedure (such as a flow chart in FIG. 6 as mentioned later) of the CPU 4, and a RAM 6 is used as a work area for the CPU 4. In a specified address position (includes an address region) of this RAM 6, color designation tables 6a to 6c, a data reception start flag 6d, etc. as mentioned later have been secured. A page buffer for black image 7a and a page buffer for red image 7b are each comprised of a memory which develops the image data when printing. A character pattern generator 8 generates a character pattern based on the instruction from the CPU 4, and outputs to page buffers 7a and 7b.

An output device 9 such as a laser beam printer records in two colors: a red and black mixed image on a recording medium on the basis of a data from page buffers 7a and 7b. Since, however, any printing mechanism capable of printing in two colors can be used in this case, a printing mechanism of any type other than this may be used. A control panel 10 designates the content of various processes to this printer, and is equipped with a designating unit which forcibly develops either page buffer 7a or 7b in a single color.

In the embodiment, a font (type of characters) name, form (such as record) name and image name, which will be printed in red, are input from the control panel 10 before actually printing.

The input font name is registered in a color designation table for font 6a within the RAM 6, the form name in a color designation table for form 6b, and the image name in a color designation table for image 6c respectively. The font names, form names and image names, which have not been designated from the control panel 10, shall be printed in black.

Figure 4A:
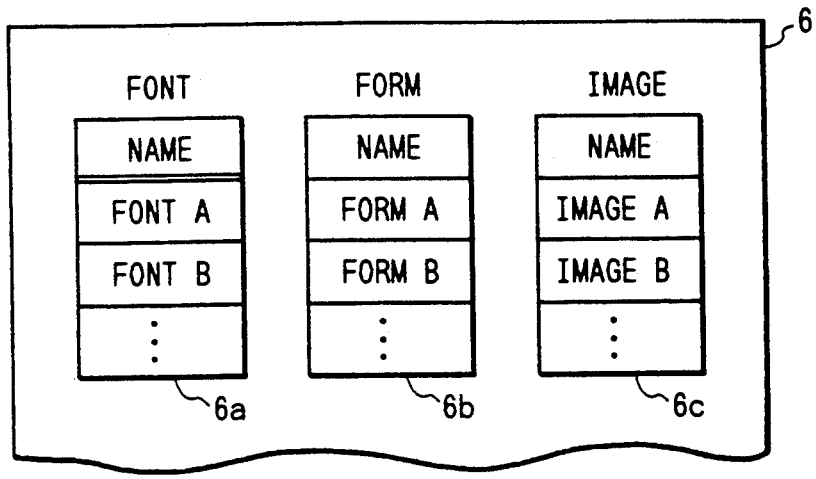
FIGS. 4A and 4B show examples of format for respective color designation tables.

FIG. 4A shows an example of each color designation table 6a to 6c. In FIG. 4A, since "FONT A" and "FONT B" have been registered as font name, these show that these will be printed in red. Also, "FORM A" and "FORM B" as form name, and "IMAGE A" and "IMAGE B" as image name will be printed in red.

Figure 5:
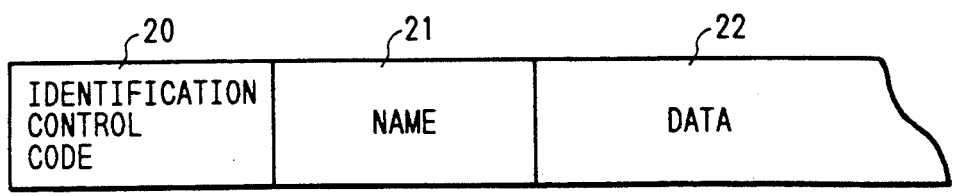
FIG. 5 shows an example of format for print data received by the printer.

Print data is transmitted in such a format as shown in FIG. 5 from the data generator 1.

That is, an identification control code 20, a name 21 and a data 22 are transmitted. The identification control code 20 shows that it is not a character code, etc., and also includes information which discriminates whether the data 22 to follow is a character code or information to form a form or further an image data. The name 21 includes a font name, form name and image name.

When it receives a character font name, a form name or an image name which have been registered in color designation tables 6a to 6c, the CPU 4 develops the corresponding image in the page buffer 7b. Also when it receives a form name, etc. which has not been registered in the color designation tables 6a to 6c, the CPU 4 develops the corresponding image in the page buffer 7a. The images, which have been thus developed in page buffers 7a and 7b, are printed one upon another by outputting to an output device 9. However, as described above, the image developed in the page buffer 7a is printed in black, and the image developed in the page buffer 7b is printed in red.

Figure 6B:
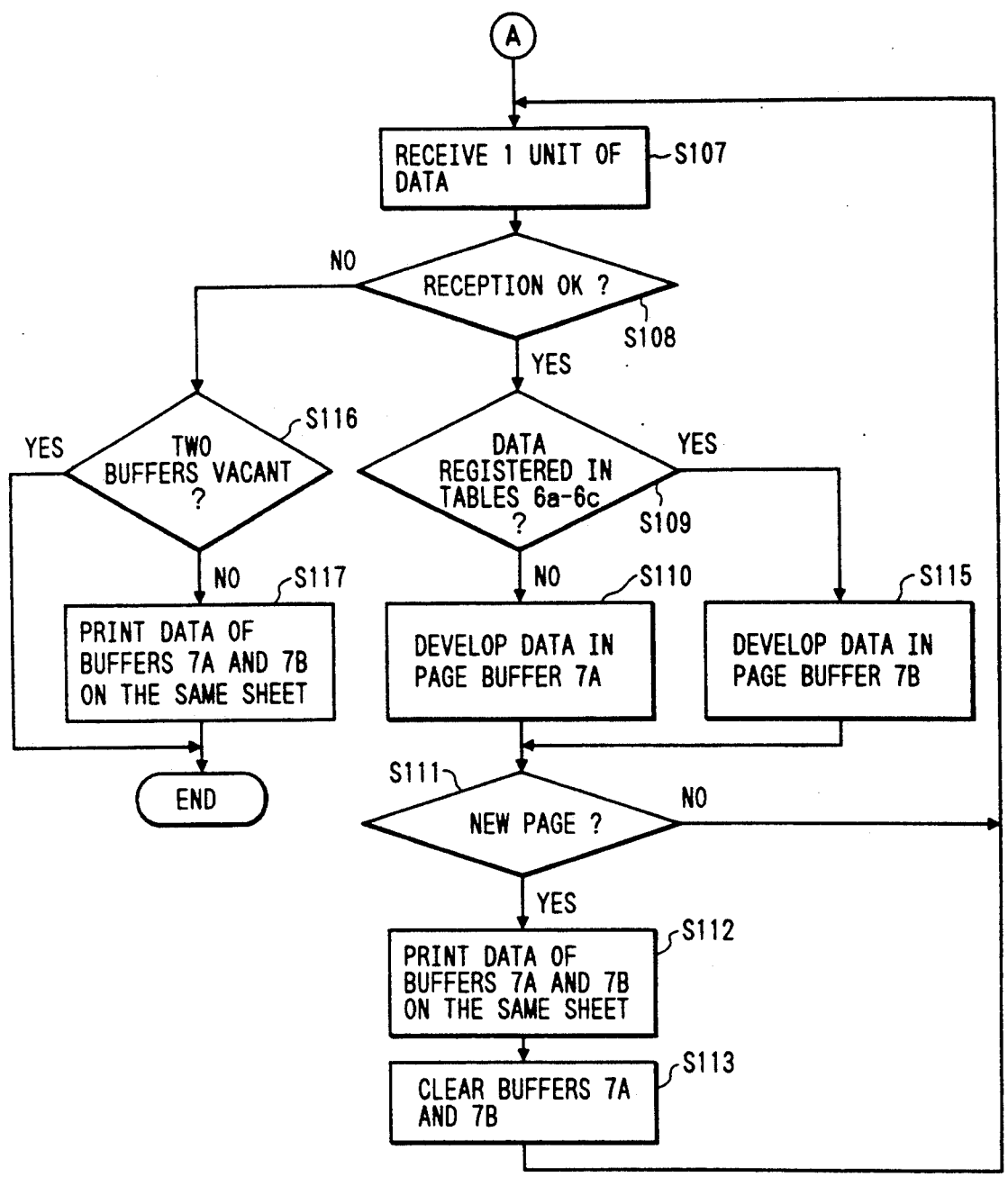

FIG. 6 is a flow chart showing the operation procedure of the CPU 4 in the embodiment. The flow of this process will be described as follows:

When the power is first turned on for this printer, all the color designation tables 6a to 6c and the data start flag 6d are cleared in steps S101 and S102.

In step S103, it is determined whether or not there was an input from the control panel 10. If NO (no input), the flow proceeds to step S106 and after, and if YES (there was an input), it is judged in step S104 whether or not the input from the control panel 10 has been registered in the table.

If it has been judged to be an input registered in the table, the flow proceeds to step S105, the name input by the operator is registered in any one of the color designation tables 6a to 6c, and the flow proceeds to step S106. Also, if judged as "NO" in step S104, that is, it has been judged to be information relating to flag set, flow proceeds to step S114, a value (ON or OFF value) input in the data reception start flag 6d is set, and then on to step S106.

In step S106, it is judged whether or not the data reception start flag 6d is in the ON state, and the process for step S103 to step S106 is repeated until the flag is in the ON state.

When the data reception start flag 6d is in the ON state, flow proceeds from step S106 to step S107 when one unit of data is received, and it is determined in step S108 whether or not it could be received (reception OK?). If YES, it is determined in step S109 whether the data is a font, a form or an image which has been registered in the color designation tables 6a to 6c.

If YES, the data is developed in the page buffer 7b (for red output) in step S115. If NO, the data is developed in the page buffer 7a (for black output) in step S110, and it is determined in step S111 whether or not a new page is used.

If NO, flow returns to step S107, and if YES, printed one upon another is the page buffer 7b in red and the page buffer 7a in black on the same paper in step S112. Hereafter, the page buffers 7a and 7b are cleared in step S113, and flow returns to step S107.

Also if judged as NO in step S108, that is, if the data could not be received, flow proceeds to step S116, and it is judged whether or not the page buffers 7a and 7b are both vacant. If vacant, the job is ended. Also if several items of data have been judged to be remaining in the page buffer 7a or 7b, item one is printed upon another with that of the page buffer 7a being printed in black and that of the page buffer 7b in red in step S117 to end the job.

The next job starts with step S103.

Figure 4B:
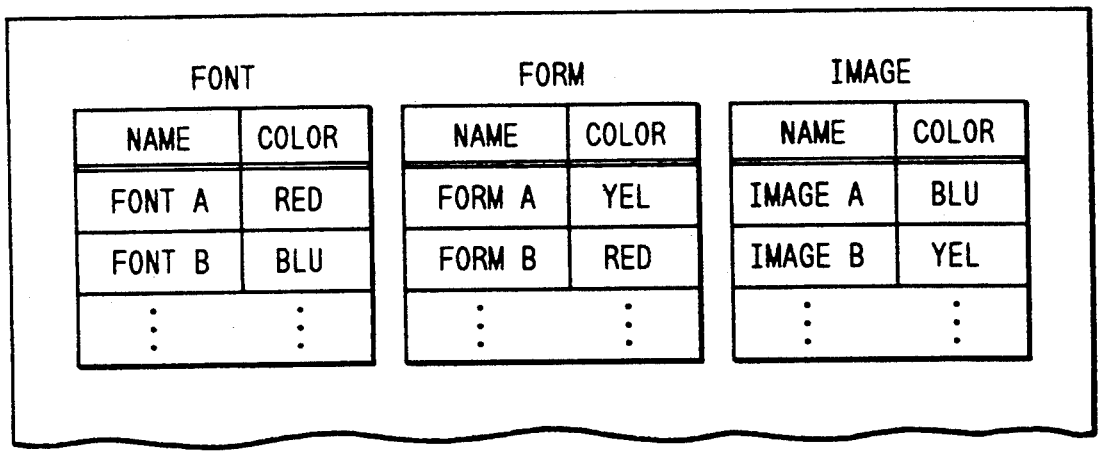

Although two colors, red and black, have been used as print colors in the embodiment, the present invention is not limited to these colors, but any other colors can be used, of course. When three colors, blue, yellow and red, for example, are used as kinds of print color, such a color designation table as shown in FIG. 4B is used because the print color cannot be specified only by designating a certain form. Of course, a color is designated by using a button, etc. provided on the control panel 10.

In the above embodiment, the font name, form name and image name, which will be printed in red, have been registered by inputting their names, but if a name, which can be selected, has been determined beforehand, it may be registered by a single operation by providing the control panel 10 with buttons, etc. for the kind.

The second embodiment, in which a desired color is set to an input single color data as the output data, will be described.

Figure 7:
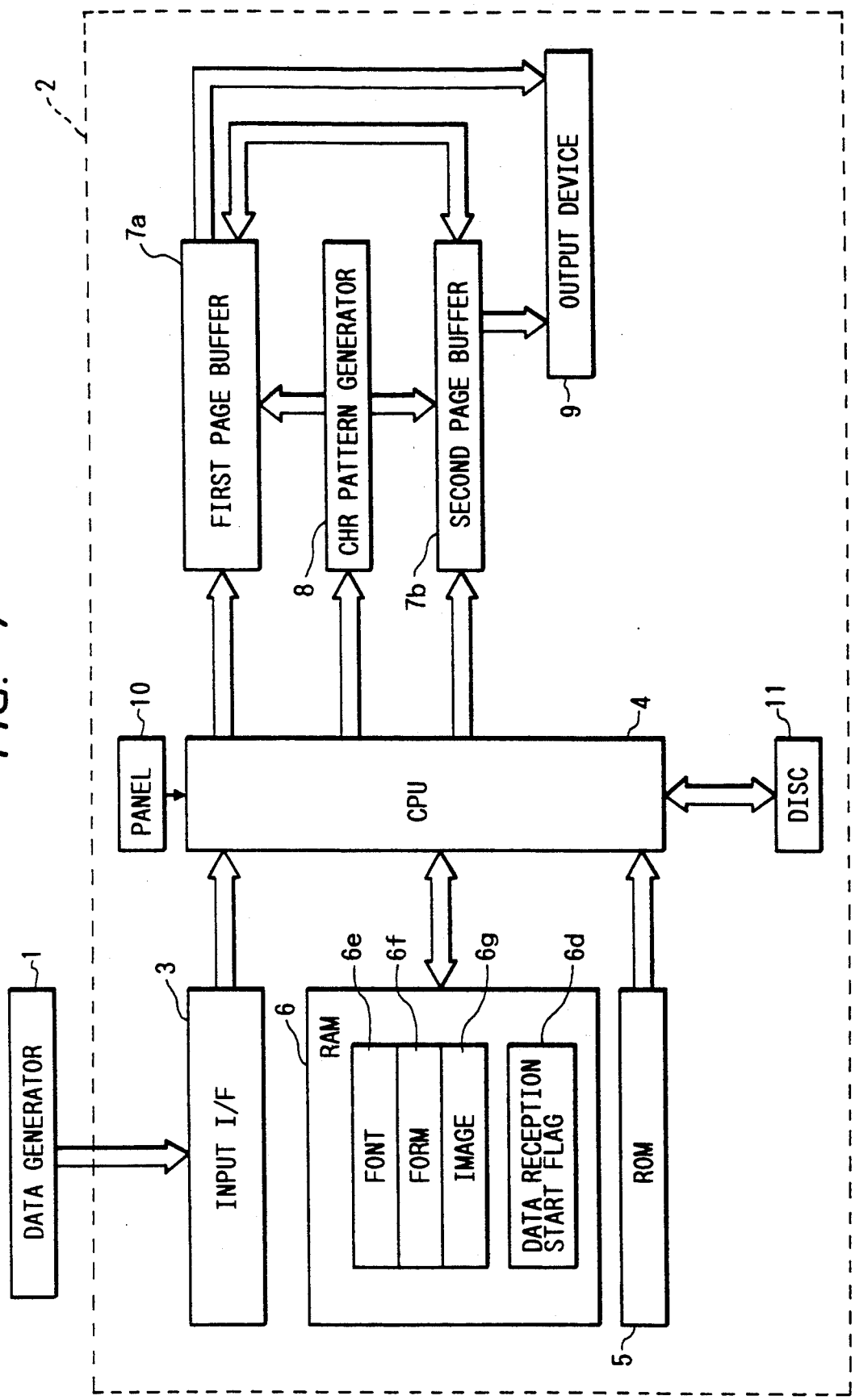
FIG. 7 is a block diagram showing the configuration of a printer of the second embodiment to set a desired color in an input single color data as the output data.

FIG. 7 is a block diagram of a printer in the second embodiment. To simplify the description, the same components as in the first embodiment are assigned with the same numerals.

As shown in FIG. 7, however, a disk 11 is newly added as an external memory. This disk 11 stores a font pattern, form data, and image data as a file, and each file is provided with an output color. The RAM 6 is provided with a data reception start flag 6d like in the above first embodiment, but is also provided with registration areas 6e to 6g for fonts, forms and images which will be used when newly printing.

FIGS. 8A to 8C show the formats of the font, form and image on the disk 11 and on the RAM 6, and each of these has a color attribute area. On the disk 11, they exist under the file name of "name+extension".

Figure 9B:
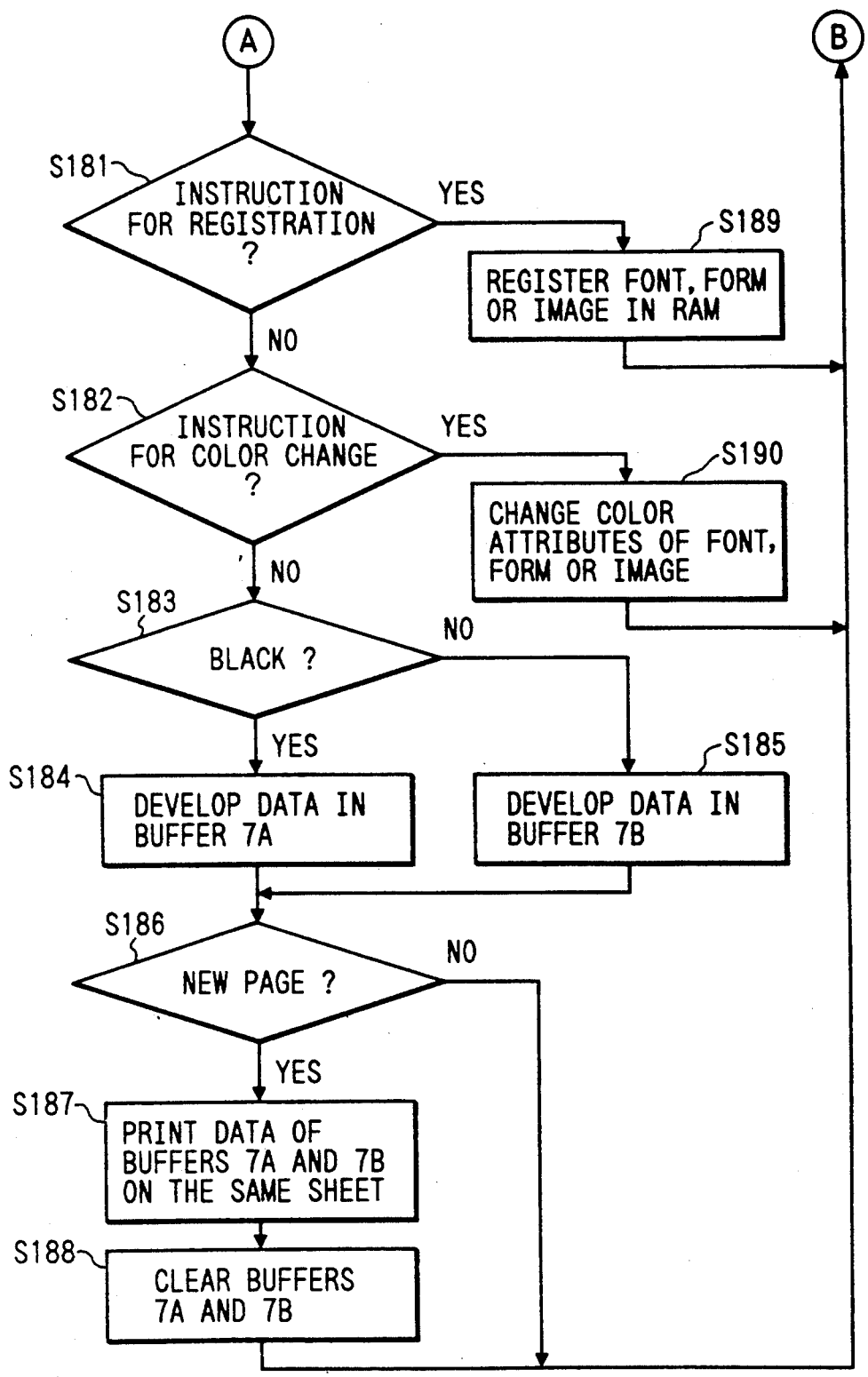

The operation procedure of the CPU 4 in the second embodiment will be described referring to the flow chart in FIG. 9 below.

When the power is first turned on for this printer, all the registration areas 6e to 6g and the data start flag 6d are cleared in step S171.

In step S172, it is determined whether or not there was an input from the control panel 10. If NO (no input) flow proceeds to step S176, and if YES (there was an input), it is judged in step S173 whether or not the input from the control panel 10 is an instruction relating to color to be changed.

If YES (it has been judged to be an instruction for color to be changed), flow proceeds to step S174 to change the color for the font, form or image on the disk 11 in accordance with the input data, and flow proceeds to step S176.

If NO, it is judged that it is an instruction for data reception start, and the data reception start flag 6d is set in step S175 to the ON state, and flow proceeds to step S176.

In step S176, it is judged whether or not the data reception start flag 6d is in the ON state, and the processes of step S172 to step S176 are repeated until the flag switches the ON state.

When the data reception start flag 6d is in the ON state, flow proceeds from step S176 to step S177 to receive one unit of data, and it is judged in step S178 whether or not the data could be received (reception OK?).

If YES, it is determined in step S181 whether or not the data is an instruction for registration of the font, form or image on the RAM. If it is the instruction for registration, it is registered in the corresponding font, form or image registration areas 6e to 6g on the RAM 6 in step S189, and flow returns to step S177.

If judged as NO in step S181, that is, the received data has been judged to be other than a data for registration, flow proceeds to step S182 to determine whether or not the input data is an instruction for color change. If YES, flow proceeds to step S190 to change the color attributes for the font, form or image registered on the RAM 6, and flow returns to step S177.

If judged as NO in step S182, flow proceeds to step S183, and it is judged whether or not the color attributes for the font, form or image corresponding to the received data are black. If black, the corresponding image (character pattern, form pattern or image) is developed in the page buffer 7a in step S184. If red, the is developed in the page buffer 7b in step S185.

After developing the image for the received data in the page buffer 7a or 7b in this way, flow proceeds to step S186. It is judged in step S186 whether or not the new page is used. Only when YES in this judgement, is the image developed in the page buffers 7a and 7b printed on the same recording sheet in step S187, and these page buffers 7a and 7b are cleared in step S188. Thereafter, flow returns to step S177.

If judged as NO in step S178, that is, the data could not be received, flow proceeds to step S179, and it is judged whether or not the page buffers 7a and 7b are both vacant. If vacant, the job is ended. If several items of data have been judged to remain in the page buffer 7a or 7b, the data of the page buffer 7a is printed in black and that of the page buffer 7b in red one upon another in step S180 to end the job.

The next job starts with step S102.

According to the embodiment of the present invention as described above, it is possible to set such a color for character, form and image as intended by the operator even for less amount of information for single color than an amount of information for multicolor print. That is, a point, which should be simply emphasized, can be emphasized even in a single color data, and legible page configuration can be made.

What is claimed is:

1. A printer comprising:
    input means for inputting output information for developing image information;
    table registration means for registering a table comprising print data for respective form names and color information representing a color in which the print data are to be output;
    discriminating means for discriminating whether form data specified by one of the form names included in the table exists in the output information input by said input means; and
    control means for controlling said printer to output the form data discriminated by said discriminating means in the color represented by the color information registered in said table registration means.

2. A printer according to claim 1, wherein the print data comprise a type of characters.

3. A printer according to claim 1, wherein the print data comprise a type of forms.

4. A printer according to claim 1, wherein the print data comprise a type of image data.

5. A printer according to claim 1, wherein said control means controls said printer such that the print data are developed in a bit map memory corresponding to the color information stored in said table registration means.

6. A printing method comprising the steps of:
    inputting to a printer output information for developing image information;
    registering a table comprising print data for respective form names and color information representing a color in which the print data are to be output;
    discriminating whether form data specified by one of the form names included in the table exists in the output information input in said inputting step; and
    controlling the printer to output the form data discriminated in said discriminating step in the color represented by the color information registered in said registering step.

7. A printing method according to claim 6, wherein the print data comprise a type of characters.

8. A printing method according to claim 6, wherein the print data comprise a type of forms.

9. A printing method according to claim 6, wherein the print data comprise a type of image data.

10. A printing method according to claim 6, wherein in said controlling step the printer is controlled such that the print data are developed in a bit map memory corresponding to the color information registered in said registering step.

* * * * *

UNITED STATES PATENT AND TRADEMARK OFFICE
CERTIFICATE OF CORRECTION

PATENT NO. : 5,323,487

DATED : June 21, 1994

INVENTOR(S) : Tetsuya MORITA, et al.

It is certified that error appears in the above-indentified patent and that said Letters Patent is hereby corrected as shown below:

COLUMN 1:

Line 15, "develop" should read --developed--;
Line 30, "included" should read --includes--;
Line 32, "a data" should read --data--;
Line 37, "had" should read --has--.

COLUMN 2:

Line 6, "a" should be deleted;
Line 17, "a" should be deleted;
Line 55, "an" should be deleted.

COLUMN 3:

Line 8, "16 bit x 16 bit," should read --16 bits x 16 bits,--;
Line 18, "an" (second occurrence) should be deleted;
Line 21, "an" should be deleted;
Line 38, "a" should be deleted;
Line 49, "a" should be deleted;
Line 50, "the color pattern data 102" should read --the color pattern register 102--;

UNITED STATES PATENT AND TRADEMARK OFFICE
CERTIFICATE OF CORRECTION

PATENT NO. : 5,323,487  Page 2 of 3
DATED : June 21, 1994
INVENTOR(S) : Tetsuya MORITA, et al.

It is certified that error appears in the above-indentified patent and that said Letters Patent is hereby corrected as shown below:

Line 56, "an" should be deleted;
    Line 57, "16 bit x 16 bit has" should read --16 bits x 16 bits have--;
    Line 64, "an" should be deleted.

COLUMN 4:

Line 4, "a" should be deleted;
    Line 6, "a" should be deleted;
    Line 25, "a" should be deleted;
    Line 53, "a" should be deleted;
    Line 57, "an" should be deleted.

COLUMN 5:

Line 51, "item one" should read --one item--.

COLUMN 6:

Line 5, "an" should be deleted;
    Line 47, "switches" should read --switches to--;
    Line 60, "a" should be deleted.

UNITED STATES PATENT AND TRADEMARK OFFICE
CERTIFICATE OF CORRECTION

PATENT NO. : 5,323,487
DATED : June 21, 1994
INVENTOR(S) : Tetsuya MORITA, et al.

It is certified that error appears in the above-indentified patent and that said Letters Patent is hereby corrected as shown below:

COLUMN 7:

Line 3, "the" (second occurrence) should read --the image--;
Line 30, "a" should be deleted.

Signed and Sealed this

Second Day of May, 1995

BRUCE LEHMAN

*Attest:*

*Attesting Officer*     Commissioner of Patents and Trademarks